125,646

UNITED STATES PATENT OFFICE.

JOSEPH WOLFF, OF CHICAGO, ILLINOIS.

IMPROVEMENT IN YEAST FOR BREWERS AND OTHERS.

Specification forming part of Letters Patent No. 125,646, dated April 9, 1872.

*To all whom it may concern:*

Be it known that I, JOSEPH WOLFF, of Chicago, in the county of Cook and State of Illinois, have invented certain new and useful Improvements in Compressed Yeast; and I hereby state that the following is a clear, full, and exact description thereof.

The nature of my invention consists in producing from the fermenting "mash," used in the manufacture of malt and spiritous liquors, a yeast suitable for distillers, vinegar factories, and for baking purposes.

Having thus described the nature of my invention, I will proceed to give in detail the manner in which I have carried it out.

The yeast for "mashing" is the same as described in my Letters Patent No. 99,615, and dated February 8, 1870; reissued May 3, 1870; and my process for mashing is as follows: Take to each bushel of grain twenty-five gallons of water; heat the water to about 154° Fahrenheit, and let the grain be sixty parts of corn, thirty-four parts of rye, wheat, or barley, and six parts of malt of barley, rye, wheat, or corn, kiln-dried or sprouted; or it may be fifty parts of corn, forty-four of rye, and six parts malt; or ninety-four per cent. rye or wheat and six per cent. malt. Scald the corn to 185° Fahrenheit and let it stand for thirty minutes; then cool the mash to about 154° Fahrenheit, and add the rye and malt in the mash, and let it stand thirty minutes more. When this time has expired, cool the mash down as usual, and take clear sour slop-water; or, if this is not convenient, use cold water for the balance of the proportion of water. To obtain the slop-water have a big tub which holds the whole day's slop, and let it settle over night. In the morning draw off the clear slop. The mash should not be colder in the winter than 82° Fahrenheit, and in the summer about 78° Fahrenheit in the fermenting tub. After twelve or sixteen hours have elapsed bubbles and froth commence to form in large quantities, and as soon as the froth or foam becomes as white as milk, commence to skim it off and strain through a hair sifter or silk bag into a tub. Skim from time to time during from three to nine hours until the bubbles cease to rise, and it is finished. Fill the tub full of water and let it remain from six to twelve hours; then discharge the water from the tub until it looks yellow; then stop the water and rinse the yeast well, and strain it into another tub; then proceed as with the first tub. When the water is discharged take a paddle and scrape the scum from off the yeast which has settled to the bottom of the tub, and put it in woolen or linen bags, and put these under a hydraulic or other suitable press. Let them thus remain until all the water is expressed and the yeast assumes a solid form.

Having thus described my invention, what I claim as new, and desire to secure by Letters Patent, is—

The process above described for the manufacture of compressed yeast suitable for distillers, brewers, vinegar manufacturers, and baking purposes.

JOSEPH WOLFF.

Witnesses:
RUDOLPH RUHBAUM,
ALBERT WEISS.